Jan. 15, 1957 L. KOVACH 2,777,913
SPEED CONTROLLING DEVICE FOR AUTOMOBILES
Filed Sept. 28, 1954 3 Sheets-Sheet 1
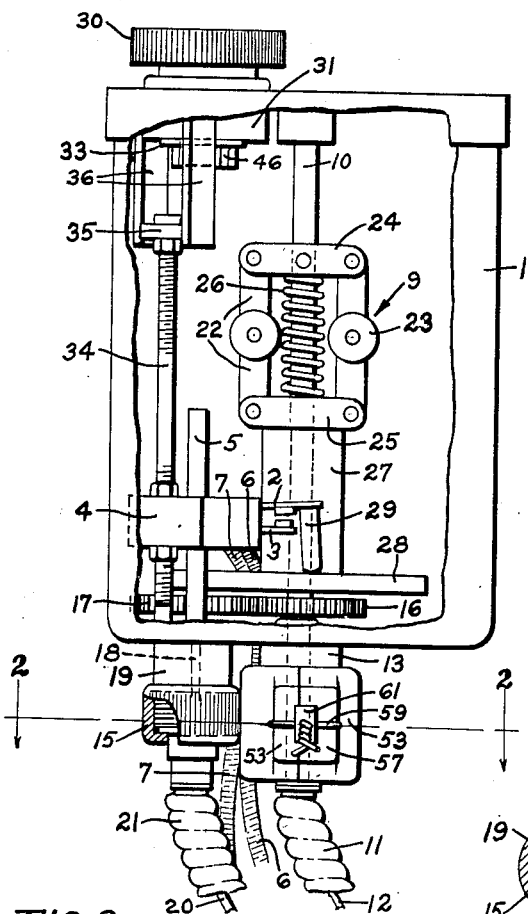
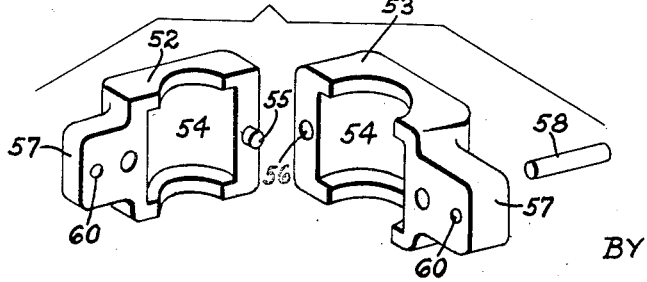
INVENTOR
LESLIE KOVACH
BY
*Louis C. Smith*
ATTORNEY.

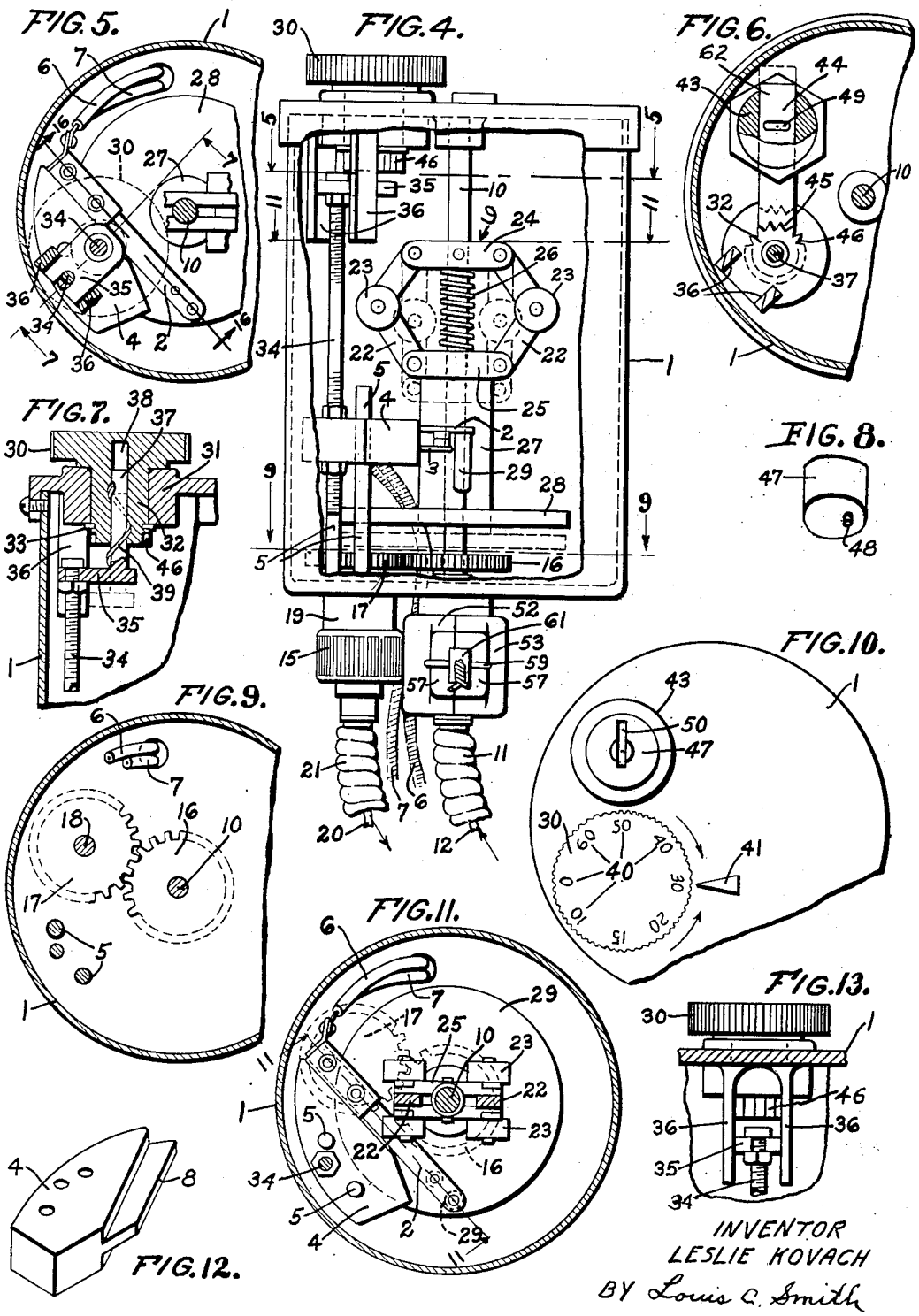

Jan. 15, 1957 L. KOVACH 2,777,913
SPEED CONTROLLING DEVICE FOR AUTOMOBILES
Filed Sept. 28, 1954 3 Sheets-Sheet 3
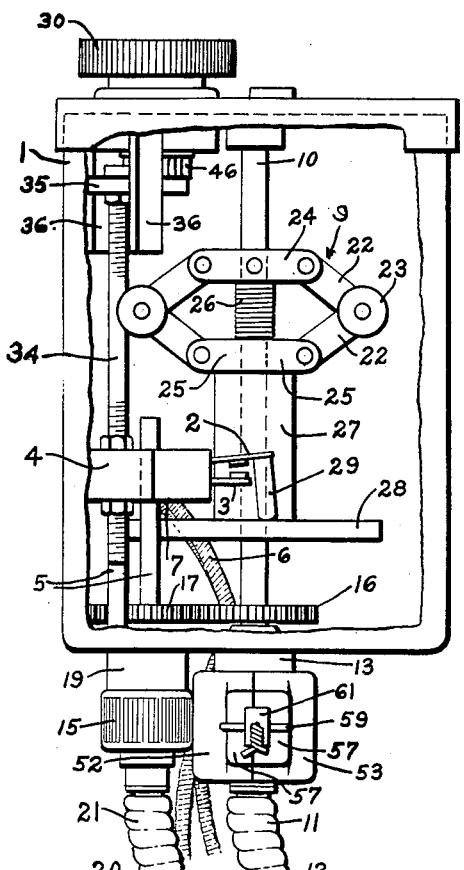
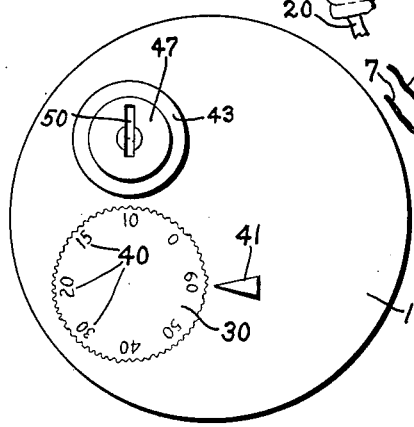
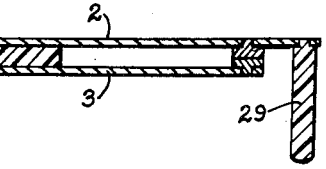
INVENTOR
LESLIE KOVACH
BY Louis C. Smith
ATTORNEY United States Patent Office 2,777,913
Patented Jan. 15, 1957

2,777,913

SPEED CONTROLLING DEVICE FOR AUTOMOBILES

Leslie Kovach, Fitchburg, Mass.

Application September 28, 1954, Serial No. 458,737

2 Claims. (Cl. 200—80)

This invention relates to speed controlling devices for automobiles, and particularly to devices of this type in which the control of the speed is accomplished by opening the ignition circuit of the automobile when the latter reaches or exceeds the speed for which the device has been set.

The device also is of that known type in which the setting mechanism can be locked in any set position by means of a key-operated lock so that only the person possessing the appropriate key will be able to adjust the setting.

One of the features of the present invention is a construction by which when the device is set to zero the ignition circuit will be opened, and the automobile can be started only by re-setting the device for a driving speed above zero.

If the device is locked at the zero setting, then the automobile can not be started by any unauthorized person who does not possess the key to the lock which will permit him to unlock the setting device and readjust it to a starting position. The device, therefore, provides a lock for the automobile which is in addition to the lock provided by the regular ignition key.

Other features of the invention relate to the manner in which the speed controlling device is operatively connected to the driving means for the regular speedometer and to means which prevent anyone from disconnecting the speed regulating device from the driving connections for the speedometer.

In order to give an understanding of the invention I have illustrated in the drawings a selected embodiment thereof which will now be described, after which the novel features will be pointed out in the appended claims.

In the drawings:

Fig. 1 is a view with a portion of the enclosing casing broken out to better show the operative parts, said view showing the device set in zero position;

Fig. 2 is a section on the line 2—2, Fig. 1;

Fig. 3 is an exploded view showing the sealing means which prevents anyone from tampering with the driving connections for the device;

Fig. 4 is a view similar to Fig. 1 but showing the device set for a moderate speed limit;

Fig. 5 is a section on the line 5—5, Fig. 4;

Fig. 6 is a section on the line 6—6, Fig. 4;

Fig. 7 is a section on the line 7—7, Fig. 5;

Fig. 8 is a fragmentary view of a portion of the lock;

Fig. 9 is a section on the line 9—9, Fig. 4;

Fig. 10 is a partial plan view of the device showing the setting knob set at a moderate speed;

Fig. 11 is a section on the line 11—11, Fig. 4;

Fig. 12 is a perspective view of the contact carrying member;

Fig. 13 is a section on the line 13—13, Fig. 7;

Fig. 14 is a view similar to Fig. 1 but showing the device set for a high speed and illustrating the manner in which the contacts are opened to break the ignition circuit when the automobile is exceeding such high speed;

Fig. 15 is a plan view of Fig. 14 showing the setting knob positioned at the high speed point.

Fig. 16 is an enlarged section on the line 16—16, Fig. 11.

The operative parts of the device are enclosed in a suitable casing 1 which may be mounted on any appropriate part of the automobile, such for instance as the cowl. The contacts by which the ignition circuit is opened and closed for controlling the speed of the automobile are shown at 2 and 3, said contacts being preferably spring contacts which are mounted on a contact-carrying member 4 of insulating material, said member being vertically adjustable, as will be presently described, to vary the speed limit of the automobile. As herein shown, the member 4 is guided in its vertical adjusting movement by two upstanding pins 5 which are secured to and rise from the bottom of the casing 1. The means for adjusting the member 4 will be presently described.

The two contacts 2 and 3 are connected in the ignition circuit of the automobile through the medium of two wire connections 6 and 7 which form part of the ignition circuit, one of such wire connections being connected to the contact 2 and the other to the contact 3. The contact-carrying member 4 is formed with a laterally extending rib 8 on which the contacts 2 and 3 are mounted, the contact 2 being placed on top of the rib 8 and the contact 3 being located beneath the rib. These two contacts may be secured to the rib in any desired manner which will provide the necessary insulation between them, and each contact has a free end which extends beyond the rib, as shown in Figs. 1–11. The contacts are constructed so that they are normally closed, as shown in Fig. 4. The opening of the contacts when the speed of the automobile reaches a predetermined limit for which the device is set is accomplished through the medium of a centrifugal governor device 9 which is mounted on a shaft 10 that is journaled in the casing 1. The shaft 10 extends through the bottom of the casing and is connected to the driving connections leading from the transmission, or some other part of the automobile, to the speedometer, such driving connections being commonly in the form of a flexible shaft 12 enclosed in a flexible tubular casing 11. The section of this driving shaft 12 which leads from the source of power, and which may be referred to as the first driving connection, is connected to the governor shaft 10 so that the said shaft 10 will rotate at a speed which corresponds to that of the automobile when it is being driven. The casing 1 has a depending tubular extension 13 which is screw threaded at its bottom and to which the tubular casing 11 is secured by means of a clamping nut 14 similar to the clamping nut indicated at 15 in Fig. 1.

A driving connection is provided between the governor shaft 10 and the speedometer, and this connection consists of a gear 16 mounted on the shaft 10 which meshes with a gear 17 that is mounted on a short shaft 18 which extends through the bottom of the casing 1 and is journaled in the hub portion 19. Said shaft 18 is connected to the end of a flexible shaft 20 which leads to the speedometer, said shaft 20 being enclosed in a flexible tubular casing 21 which is secured to the hub 19 by the nut 15. The shaft 20 may be referred to as a second driving connection.

With the above arrangement the governor shaft 10 forms part of the complete driving connection between the source of power for the speedometer and said speedometer.

The governor 9 may be of any usual type and is shown as comprising two joined arms 22 carrying weights 23, the upper end of each joined arm being pivotally mounted to an upper head 24 which is fast on the vertical shaft 10, and the lower end of such arms being pivotally mounted to a lower head 25 which is slidably mounted on the shaft 10. A spring 26 which encircles the shaft between the heads tends to force the heads apart, and when the shaft 10 is not rotating the spring 26 moves the lower head 25 downwardly to the limit permitted by the jointed arms 22.

The lower head 25 has rigid therewith a sleeve 27 which encircles the shaft 10 and is slidable axially thereof, said sleeve having at its lower end a disk 28 which underlies the end portions of the contacts 2 and 3, the contact 2 having a depending finger 29 adapted to be engaged by the disk 28 when the latter moves upwardly, the disk 28 and finger 29 being of insulating material.

When the automobile is standing still the disk 28 of the governor mechanism will be in the dotted line position, Fig. 4, and assuming that the device is set for a moderate speed, the contact-carrying member may be occupying the position shown in Fig. 4. When the automobile is started, the governor will be rotated at a speed corresponding to that at which the automobile is moving, and the operation of the governor will cause the disk 28 to move upwardly from the dotted line position Fig. 4 into a position such as shown in full lines. So long as the automboile is traveling within the speed limit for which the device has been set, the disk 28 will be located below the end of the finger 29, but when and if the speed of the automobile reaches or exceeds the speed limit for which the device has been set, the disk will move upwardly into a position to engage the finger 29 and raise the latter, thereby separating the contacts 2 and 3 and opening the ignition circuit, as illustrated in Fig. 14. The opening of the ignition circuit will temporarily put the automble engine out of action and the speed of the automobile will decelerate with the result that the disk 28 will move downwardly, and when the deceleration has reached a point below that at which the device has been set, the contacts 2 and 3 will automatically close again, thereby activating the automobile engine.

The means for setting the contact-carrying member 4 includes a setting knob 30 which is mounted for turning movement in a bearing portion 31 of the top of the casing, said knob having a hub portion 32 which extends through the bearing portion. While the setting knob 30 is mounted for turning movement, yet it is held from axial movement by means of a split washer 33 which is mounted in a circumferential groove formed in the lower end of the hub, and which bears against the lower face of the bearing portion 31.

Means are provided whereby turning movement of the setting knob 30 will cause a vertical movement of the contact-carrying member 4. For this purpose said member 4 has mounted therein a vertical connecting rod 34, the upper end of which is secured to a vertically movable member 35 which is guided in its vertical movement by guiding arms 36 depending from the top of the casing 1. This member 35 has a cylindrical post 37 rising therefrom which operates in an axial recess 38 with which the setting knob 30 is provided. The post 37 has a spiral rib 39 which is received in a spiral groove formed in the setting knob 30, said spiral rib and the groove in which it fits acting as a screw thread to move the member 35 vertically when the knob 30 is turned. The setting knob 30 is provided with graduations 40 on its upper surface which cooperate with an index member 41 carried by the top of the casing 1 for the purpose of indicating the speed limit for which the device is set. If, for instance, it is desired to limit the speed of the automobile to 30 miles per hour, the setting knob 30 will be set as shown in Fig. 10 to indicate such speed, or if a 60 miles per hours limit is desired, the setting knob will be set as shown in Fig. 15.

When the setting knob is set in the zero position, the contact-carrying member 4 and the contacts will be in their lowered position shown in Fig. 1, and when the automobile is at rest the disk 28 of the governor will be in its low position shown in Fig. 1. The construction is such that when the automobile is at rest and the setting knob 30 is set at the zero position, the finger 29 will be in engagement with the disk 28, and the contacts 2 and 3 will be held open, as shown in Fig. 1. In order to close the ignition circuit it will be necessary to re-set the contacts into an elevated position in which the finger 29 is out of contact with the lowered disk 28.

The invention also includes a locking device for locking the setting knob 30 from turning. This locking device is mounted in the top of the casing 1 and it includes a lock body 43 having a transverse slot in which a locking latch 44 is slidably mounted, said latch having at one end the serrated portion 45 adapted to interlock with teeth 46 formed on the lower end of the setting knob 30. The locking latch 44 is movable laterally into locking engagement with the teeth 46, as shown in full lines Fig. 6, or into an unlocked position shown in dotted lines Fig. 6, and when it is in its unlocked position the set knob 30 is free to be turned for setting the device. The movement of the locking latch 44 is provided for by a key operated plug 47 which has at its lower end an eccentrically located pin 48 which operates in a slot 49 with which the locking latch 44 is provided. The plug 47 is provided with a key slot 50 adapted to receive a suitable key by which the plug can be turned. The turning of the plug operates to move the latch member 44 into its locking or unlocking position, as will be obvious.

When the locking latch is in its locked position the key slot has the position shown in Fig. 10 and the key can then be removed from the slot, but when the locking latch is in its open position the key is prevented from being withdrawn from the key slot. When, therefore, the setting mechanism is locked either in zero position or in any other position and the key has been removed from the key slot, the device can not be re-set except by a person who has possession of the key. The lock is of that known type which is so constructed that the key can be removed from the key slot 50 only when the latch 44 is in its locked position and said slot has the position shown in Figs. 10 and 15.

In the construction herein shown the unlocking or retracting movement of the latch 44 is limited by the engagement of its end 62 with the side wall of the casing 1, and this limit is reached when the key plug 47 has made a turning movement less than a half rotation. As a result the key cannot be removed from the key slot so long as the lock is in its unlocked condition, but only when the lock is in its locked condition.

In order to prevent anyone from disconnecting the driving shaft 12 from the governor shaft 10, thereby putting the speed controlling mechanism out of commission, the nut 14 by which the flexible casing 11 and the shaft 12 are connected to the hub 13 is enclosed in a split cover device. This cover device comprises the two parts 52 and 53, each having a concave recess 54 to receive the nut 14 so that when the two parts 52, 53 are assembled in embracing relation with the nut 14, the latter will be completely enclosed and inaccessible. The part 52 is shown as having a positioning pin 55 which is adapted to be received in a recess 56 with which the part 53 is provided, and the two parts are provided with the extensions 57 which have a mating relation when the two parts are in their operative position enclosing the nut 14. A pin 58 extending through the two extensions serves to hold them in proper alinement, and the two parts are tied together and sealed by means of a sealing wire 59 which extends through alined openings 60 in the extensions, and the ends of which are sealed together by a metal seal 61.

With this construction no one can obtain access to the nut 14 for the purpose of disconnecting the governor shaft 10 from the flexible driving shaft 12 without break-

I claim:

1. A speed regulating device for automobiles having an ignition circuit and a speedometer, said device including a casing, a pair of normally closed contacts located within the casing and connected in the ignition circuit of the automobile, contact setting means to move the contacts bodily to set them for any selected speed limit between zero miles per hour and a predetermined maximum speed, driving connections for the speedometer, a rotary governor device located in the casing, means operatively connecting said governor device to said driving connections whereby said governor device is rotated concurrently with the operation of the speedometer, said governor device having means operative to open the contacts when it is idle and said contacts are set for zero speed and also to open said contacts when they are set for a predetermined selected speed and the automobile is operating at a speed greater than said predetermined selected speed, said contact setting means including a manually operable setting knob mounted on the casing and having a portion located outside the casing by which said knob can be turned and also having a portion extending into the interior of the casing and provided with teeth, a slidable locking latch located within the casing and having at one end teeth for engagement with the teeth of the setting knob, said locking latch being movable between an inoperative position in which its teeth are out of engagement with the teeth of the setting knob and an operative position in which its teeth are in locking engagement with those of the setting knob, and key operated means to move the locking latch from one position to another.

2. A speed regulating device for automobiles having an ignition circuit and a speedometer, said device comprising a pair of normally closed contacts connected in the ignition circuit, contact setting means to set the contacts for any selected speed limit, a governor device for opening the contacts when the speed limit has been reached, driving connections for the speedometer including a first driving connection section leading from a moving part of the automobile to the governor device, means including a clamping nut for detachably connecting said first driving connection to the governor device, a two-part cover entirely enclosing said clamping nut, and means sealing the two parts of the cover together, and a second driving connection located adjacent the first driving connection and connecting the governor device and the speedometer, said second driving connection cooperating with the sealed two-part cover to prevent rotation thereof.

References Cited in the file of this patent

UNITED STATES PATENTS

| | | |
|---|---|---|
| 1,117,361 | Evans | Nov. 17, 1914 |
| 1,384,730 | Crawford | July 12, 1921 |
| 1,401,396 | Davis | Dec. 27, 1921 |
| 1,790,330 | Smith | Jan. 27, 1931 |
| 2,208,904 | Knight et al. | July 23, 1940 |
| 2,677,733 | Haley | May 4, 1954 |